(12) United States Patent
Parizat et al.

(10) Patent No.: US 7,464,961 B2
(45) Date of Patent: Dec. 16, 2008

(54) VARIABLE OUTPUT INFLATOR

(75) Inventors: Amnon Parizat, Old Westbury, NY (US); Robert Cannetti, Kings Park, NY (US); Volker Seiler, Wolfen (DE); Juergen Markwardt, Gröbzig (DE)

(73) Assignee: Island Pyrochemical Industries Corp., Mineola, NY (US)

( * ) Notice: Subject to any disclaimer, the term of this patent is extended or adjusted under 35 U.S.C. 154(b) by 314 days.

(21) Appl. No.: 11/452,576

(22) Filed: Jun. 14, 2006

(65) Prior Publication Data

US 2007/0290490 A1    Dec. 20, 2007

(51) Int. Cl.
*B60R 21/26* (2006.01)
(52) U.S. Cl. ........................... 280/741; 280/736
(58) Field of Classification Search .......... 280/736, 280/741, 742; 102/530, 531
See application file for complete search history.

(56) References Cited

U.S. PATENT DOCUMENTS

| 3,813,007 | A | * | 5/1974 | Doin et al. | 222/4 |
| 5,806,884 | A | * | 9/1998 | Johnson et al. | 280/736 |
| 6,036,226 | A | * | 3/2000 | Brown et al. | 280/736 |
| 6,039,347 | A | * | 3/2000 | Maynard | 280/736 |
| 6,889,613 | B2 | * | 5/2005 | Parizat et al. | 102/530 |
| 2004/0051283 | A1 | * | 3/2004 | Parizat et al. | 280/736 |

* cited by examiner

*Primary Examiner*—Ruth Ilan
(74) *Attorney, Agent, or Firm*—Francis C. Hand; Carella, Byrne, Bain

(57) ABSTRACT

The variable output inflator includes an injection piston assembly containing a sealed container of liquid propellant. The movement of the injection piston of the assembly is controlled by an electromagnetic valve that controls the flow of a fluid from a reservoir and against which an annular skirt of the injection piston moves during actuation.

14 Claims, 3 Drawing Sheets

VARIABLE OUTPUT INFLATOR

This invention relates to a variable output inflator. More particularly, this invention relates to a variable output inflator for inflating airbags in vehicles.

Various types of airbag inflators have been known for inflating airbags in vehicles, such as described in U.S. Pat. Nos. 6,036,226; 5,669,631; and 5,060,973, in order to protect an occupant against injury, for example, during a crash of the vehicle. Typically, the inflators have been constructed to introduce an inflation gas into the airbag within a very short time period and usually at a substantially constant rate. However, many of the known constructions have been too heavy and too long to be used for side impact protection due to the location required in a vehicle, such as an automobile.

U.S. Pat. No. 6,889,613 describes a variable output inflator that is able to inflate an airbag at a variable rate in dependence on various parameters or events occurring during the crash of a vehicle. In particular, this inflator employs a magnetic control unit for controlling the delivery of a liquid propellant into a combustion chamber of the inflator. The magnetic control unit, in turn, employs a magneto-rheological fluid and an electromagnetic coil that affects the rheological properties of the fluid in response to a signal from an outside source.

It is an object of this invention to provide an improved variable output inflator.

It is another object of the invention to house the liquid propellant of a variable output inflator in a manner to withstand all environmental conditions.

It is another object of the invention to provide a variable output inflator of small compact construction.

It is another object of the invention to provide a variable output inflator that can be used for frontal passenger protection as well as side-impact protection.

It is another object of the invention to provide a variable output inflator of a size to fit into a steering column for frontal driver protection.

It is another object of the invention to control the operation of a variable output inflator by means of a fluid that is not temperature-sensitive.

Briefly, the invention provides a variable output inflator that is of compact construction and that has a housing, for example of elongated cylindrical shape, that defines a combustion chamber and that has at least one port for expelling combustion gas from the combustion chamber. In addition, the inflator includes an initiator of conventional construction that is mounted on a forward end of the housing for introducing a combustion gas into the combustion chamber as well as injection piston assembly of unique construction that is mounted in the combustion chamber to cooperate with the initiator.

In accordance with the invention, the injection piston assembly is constructed to be slid into the housing and positioned in spaced relation to the initiator. The assembly includes an injection piston having a head that faces the initiator and a skirt that defines a propellant chamber as well as a cover that is mounted within an end of the skirt to sealingly close the propellant chamber. The head of the injection piston has an opening that is located on the axis of the piston assembly and receives a cap in coaxial relation to the opening. This cap includes a central manifold chamber that is in communication with the opening in the piston head and a plurality of ports that communicate the manifold chamber with the combustion chamber.

The injection piston is slidably mounted in the housing for movement between an initial position and a second position in response to the introduction of a combustion gas into the combustion chamber from the initiator.

In addition, the assembly includes a sealed container in the propellant chamber that contains a charge of liquid propellant. The container is of thin walled construction and lies over the opening in the head of the piston. When placed under pressure, the container will rupture at the opening so that the liquid propellant in the container can be expelled through the opening into the manifold chamber in the cap and, thence, through the ports in the cap into the combustion chamber.

The inflator also includes an accumulator that is mounted in the housing behind the injection piston assembly in order to define a peripheral chamber or reservoir with the housing for receiving a fluid. The accumulator has an internal chamber and at least one port communicating the peripheral chamber with the internal chamber in order to deliver the fluid thereto. When assembled, the accumulator is provided with a tape over the port, or other suitable means, in order to block communication between the two chambers. In the case of the tape, the tape is characterized in being rupturable in response to an increase in pressure in the peripheral chamber.

The accumulator is coaxial of the injection piston and abuts the cover of the piston assembly while being of a smaller outside diameter than the inside diameter of the skirt of the injection piston so that the skirt may move into the peripheral chamber during activation of the inflator thereby pressurizing the fluid in the peripheral chamber and the liquid propellant in the container. The increase in pressure causes the tape to rupture thereby allowing the fluid to escape from the peripheral container into the internal chamber of the accumulator and the skirt to continue to move into the peripheral chamber. This also causes the liquid propellant in the container within the piston assembly to be expelled into the combustion chamber.

The inflator also includes an electromagnetic valve that is mounted in the housing behind the accumulator for controlling movement of the injection piston from a first position to a second position during activation of the inflator. This electromagnetic valve includes a valve body that is disposed in sealed relation with the housing and with the accumulator to seal the fluid in the peripheral chamber. The valve body includes at least one passage that extends through the valve body in order to communicate the peripheral chamber about the accumulator with the internal chamber within the accumulator. A tape is provided over the passage in order to seal off the passage from the peripheral chamber until such time that the pressure in the peripheral chamber ruptures the tape.

In addition, the valve includes a plunger that is provided for selectively opening and closing the passage in the valve body to the flow of fluid and an electrical coil in the valve body about the plunger. In response to energization of the coil, the plunger is caused to move from a normally open position in a direction into the passage in order to close the passage to block the flow of fluid from the peripheral chamber into the internal chamber of the accumulator.

In operation, when a signal is received from a suitable sensor or source, the initiator of the inflator is activated to introduce hot combustion gases into the combustion chamber. As the gases fill and pressurize the combustion chamber, the skirt of the injection piston is pushed into the peripheral chamber surrounding the accumulator. This, in turn, pressurizes the fluid within the peripheral chamber to such an extent that the tapes disposed over the ports and passages leading to the internal accumulator chamber rupture, allowing the fluid in the peripheral chamber to flow into the accumulator. In the normally open state of the electromagnetic valve, the performance of the inflator would be a high-mass flow rate of expelled gas from the inflator for a short time. The back pressure in the fluid behind the injection piston would be low, causing the combustion pressure inside the combustion chamber to be high.

Upon actuation of the electromagnetic valve via signals from a sensor or other suitable source, the movement of the plunger is controlled to control the back pressure of the fluid in the peripheral chamber. Should the plunger be moved toward or into the closed position, the flow of fluid into the internal chamber is throttled or interrupted as the case may be. As a result, there is an increase in the back pressure in the fluid in the peripheral chamber that slows down the movement of the injection piston, thereby slowing down the injection of propellant into the combustion chamber. This results in a lower mass-flow rate for a longer time. The back pressure in the fluid behind the injection piston would be high, causing the pressure inside the combustion chamber to be lower.

In order to return the plunger to the normally open position, use is made of a spring that biases the plunger to the normally open position. The inflator can also be constructed such that the plunger is in a normally closed position. The spring would keep the valve closed and the electric coil would be used to open the valve. In an alternative embodiment, two coils with a permanent magnet may be used to move the plunger. By energizing one or the other coil, the plunger is moved in either direction without the need for a mechanical spring. The permanent magnet keeps the plunger in place when the current is turned off. In still another embodiment, a proportional solenoid can be used. This would allow a pre-determined displacement of the plunger based on the current supplied. For example, 2 amps move the plunger 1 mm, 4 amps move the plunger 2 mm, and 6 amps would move the plunger 3 mm. This would allow various openings affecting the fluid flow and the resulting back pressure.

These and other objects and advantages of the invention will become more apparent from the following detailed description taken in conjunction with the drawings wherein.

Figure 1:
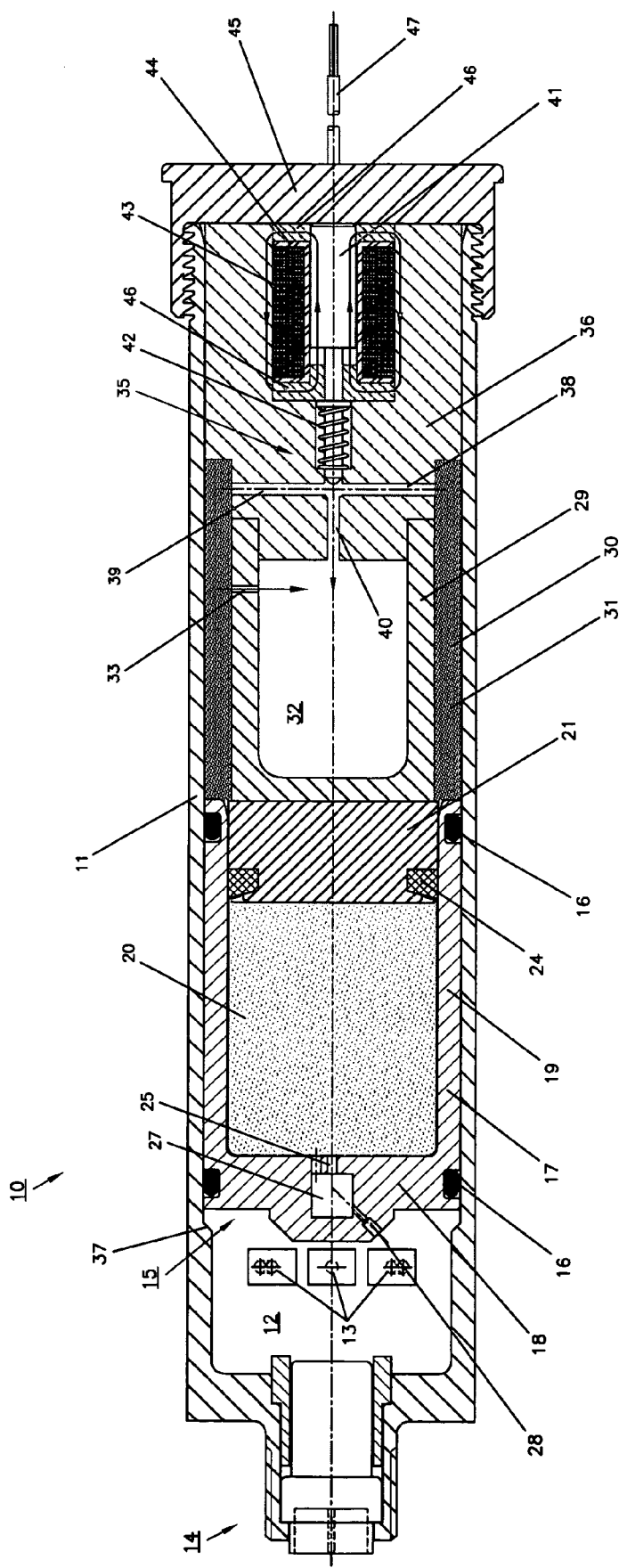
FIG. 1 illustrates a cross-sectional view of a variable output inflator constructed in accordance with the invention.

Referring to FIG. 1, the variable output inflator 10 includes a housing 11 in the form of an elongated cylindrical barrel that defines a combustion chamber 12 and that has a plurality of openings 13 for expelling gas from the combustion chamber 12.

As illustrated, the inflator 10 has an initiator 14 of conventional structure mounted in one end of the housing 11 for introducing a combustion gas into the combustion chamber 12.

The inflator 10 also includes an injection piston assembly 15 that is slidably mounted in the combustion chamber 12 of the housing 11 in spaced facing relation to the initiator 14. The injection piston assembly 15 carries an O-ring 16 at each end for sealing against the inner wall of the housing 11. The friction between the O-rings 16 and the housing 11 keep the assembly 15 in place.

The injection piston assembly 15 includes an injection piston 17 of cylindrical shape that includes a head 18 and a peripheral skirt 19 that extends from the head 18 coaxially of the housing 11. As illustrated, the injection piston 17 is hollow in order to define a propellant chamber.

The injection piston assembly 15 also includes a sealed container 20 in the propellant chamber that has a charge of liquid propellant therein. The container 20 is made with a thin wall from a suitable material, such as a fluoropolymer, and is typically filled with the liquid propellant and then sealed. The sealed container 20 can withstand all environmental conditions according to USCAR Common Inflator Specification (or equivalent), such as thermal aging, thermal shock, vibration, and the like. Further, the sealed container 20 allows the inflator 10 to function safely at temperature extremes, such as −40° Celsius and +90° Celsius without sacrificing performance. Additionally, the sealed container 20 keeps the propellant from coming in contact with any possible contaminants. Further, no seals are required to contain the propellant that can potentially leak. As is known, a leak of the propellant can cause a degradation of a propellant and create a hazardous condition.

The injection piston assembly 15 is also provided with a cover 21 that is fitted into the skirt 19 of the injection piston 17 in a sealed manner to sealingly close the propellant chamber with the container 20 therein. As illustrated, the cover 21 carries a reinforced plastic wiper ring 24 between the cover 21 and the skirt 19. The wiper ring 24 has a snug fit with the inside wall of the skirt 19 of the injection piston 17 and facilitates the crushing on the container 20.

The head 18 of the injection piston 17 includes an opening 25 into the propellant chamber that is located on the axis of the piston assembly 15 and the housing 11 as well as an enlarged central portion. The head 18 includes a central manifold chamber 27 that is in communication with the opening 25 and a plurality of ports (i.e. ejectors) 28 that communicate the manifold chamber 27 with the combustion chamber 12. The number of openings 25 depend on the number of ports 28.

When the inflator 10 is ignited, the combustion gases within the combustion chamber 12 drive the injection piston 17 to the right, as viewed. This, in turn, pressurizes the propellant container 20 so that the pressure across the thin wall of the container 20 that lies across the opening 25 ruptures, allowing the liquid propellant to flow into the manifold chamber 27, and, thus, through the ports 28 to the combustion chamber 12.

The inflator 10 also includes an accumulator 29 that is disposed in the housing 11 to define a peripheral chamber or reservoir 30 therebetween for receiving a fluid 31. The fluid 31 within the peripheral chamber 30 may, for example, be a low-viscosity silicone oil.

Figure 3:
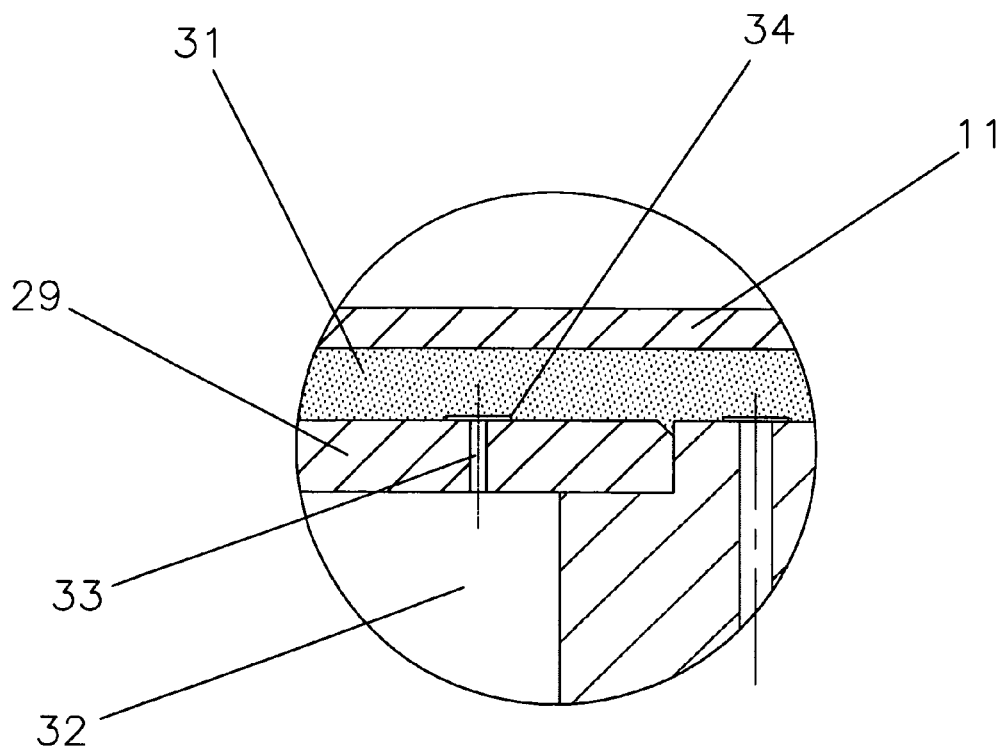
FIG. 3 illustrates a part-sectional view of the port and passage leading from the peripheral chamber.

In addition, the accumulator 29 has an internal chamber 32 as well as one or more ports 33 that communicate the peripheral chamber 30 with the internal chamber 32. As shown in FIG. 3, a tape 34 or any other suitable pressure sensitive rupturable means is disposed over the port 33 to block communication of the peripheral chamber 30 with the internal chamber 32 upon assembly. The tape 34 is characterized in being rupturable in response to an increase in pressure in the peripheral chamber 30 in response to movement of the skirt 19 of the injection piston 17 into the peripheral chamber 30.

The accumulator 29 is coaxial of the injection piston 17 and abuts the cover 21 of the piston assembly 15 while being of a smaller outside diameter than the inside diameter of the skirt 19 of the injection piston 17 so that the skirt 19 may move into the peripheral chamber 30 during activation of the inflator 10 thereby pressurizing the fluid 31 in the peripheral chamber 30 and the liquid propellant in the container 20. The increase in pressure causes the tape 34 to rupture thereby allowing the fluid 31 to escape from the peripheral container 30 into the internal chamber 32 of the accumulator 29 and the skirt 19 to continue to move into the peripheral chamber 30. This also causes the liquid propellant in the container 20 within the piston assembly 15 to be expelled into the combustion chamber 12.

The accumulator 29 has an outer diameter slightly less than the outer diameter of the cover 21 of the injection piston assembly 15 and is spaced from the inner wall of the housing 11 a sufficient distance to permit the skirt 19 of the injection piston 17 to slide thereover.

The inflator 10 also includes an electromagnetic valve 35 that is mounted in the housing 11 for controlling movement of the injection piston 17 from its initial position to a position with the skirt 19 within the peripheral chamber 30.

The electromagnetic valve 35 includes a valve body 36 that is slidably mounted within the housing 11 and that has a nose portion that is threaded into the accumulator 29 so as to position the accumulator in proper position relative to the skirt 19 of the piston 17. The valve body 35 thus serves to seal off the internal chamber 32 of the accumulator 29.

As illustrated, there is a shoulder 37 on the inside wall of the housing 11 that is spaced from the injection piston assembly 15 that allows the injection piston assembly 15 to move 1-2 mm forward. This may be needed as result of thermal expansion of the propellant inside the container 20.

The valve body 36 includes a pair of radially disposed passages 38, 39 that communicate with the peripheral chamber 30 and each other and an axial passage 40 that communicates with the radial passages 38, 39 and with the Internal chamber 32 of the accumulator. Suitable tapes, as above, are placed over the passages 38,39,40 to block the flow of fluid 31 into the internal chamber 32.

Figure 2:
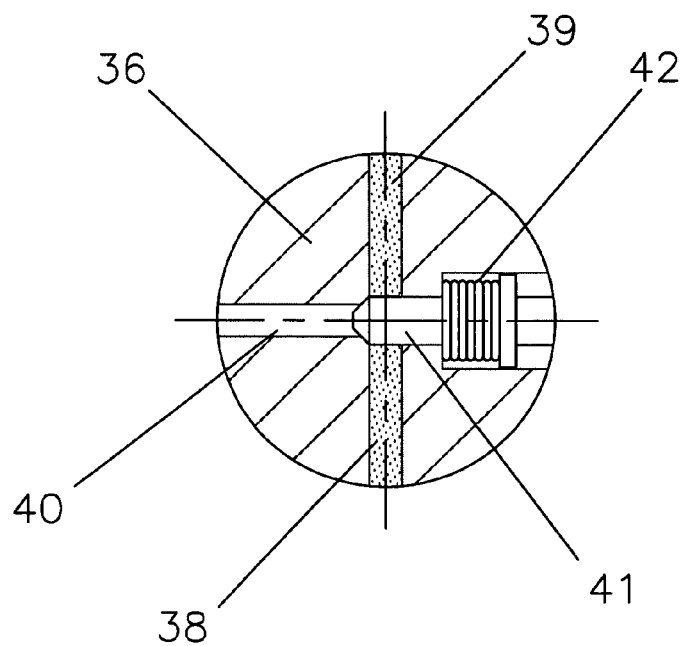
FIG. 2 illustrates a part-sectional view of a closed position of the plunger of the electromagnetic valve in accordance with the invention.

A plunger 41 made from a magnetic alloy is mounted coaxially within the valve body 36 and the housing 11 so as to move from a normally open position, as illustrated in FIG. 1, to a closed position, as illustrated in FIG. 2, to seat against the axial passage 40.

A spring 42 is provided within the valve body 36 in order to bias the plunger 41 into the normally open position.

An electrical coil 43 is wound about a cylinder 44 that is mounted in a recess of the valve body 36 about the plunger 41 and is connected to a suitable voltage source and circuit arrangement, such as the arrangement described in U.S. Pat. No. 6,564,717. In addition, suitable pole pieces 46 are provided at the ends of the cylinder 44 so that a magnetic field can be created to move the plunger 41 against the force of the spring 42 into a closed position.

The inflator 10 also includes a cover 45 that is threadably secured over a thread on the end of the housing 11 opposite from the initiator 14. An adhesive layer, for example of Loctite, may also be used between the cover 45 and housing 11 to prevent loosening. In addition, the cover 45 is provided with an opening (not shown) through which an electrical lead 47 extends to a an inflator control unit (ICU) (not shown) for delivering an electrical signal to the coil 43 for energization thereof.

In operation, when a suitable signal is delivered to the initiator 14, a stream of hot combustion gas is delivered into the combustion chamber 12. In response, the injection piston 17 begins to move to the right with the skirt 19 moving into the peripheral chamber 30, compressing the fluid 31 therein. At the same time, the sealed container 20 is compressed between the head 18 of the injection piston 17 and the stationary cover 21. When the pressure in the container 20 reaches a predetermined amount, the thin wall of the container 20 that lies across the opening 25 in the piston head 18 ruptures so that the liquid propellant begins to flow into the manifold chamber 27 in the piston head 18. This process is referred to as regenerative combustion. The container 20 is constructed so that the side-wall of the container 20 will collapse as the injection piston 17 moves towards the accumulator 29. During this time, liquid propellant is constantly injected via the manifold chamber 27 and ports 28 into the combustion chamber 12. As the injection piston 17 moves, the fluid 31 is forced through the ports 33, 38 and 39.

In particular, when the inflator 10 is activated, the fluid 31 is always free to flow from the peripheral chamber (reservoir) 30 into the internal chamber 32 of the accumulator 29 through the port 33. The plunger 41 is in the normally open position and allows the fluid 31 to flow freely from the peripheral chamber 30 through the passages 38, 39, 40 into the internal chamber 32. Under these conditions, the performance of the inflator would be a high-mass flow rate of expelled gas to at least one opening 13 for a short time. The back pressure in the fluid 31 behind the injection piston 17 would be low, causing the combustion pressure inside the combustion chamber 12 to be high.

In order to alter the mass flow rate, a low current of up to six amps is delivered to the coil 43 causing the plunger 41 to move against the force of the spring 42 to close the passage 40. The result is an increase of back pressure in the fluid 31 that slows down the movement of the injection piston 17, thereby slowing down the injection of propellant into the combustion chamber 12. A lower mass flow rate for a longer time is achieved. The back pressure in the fluid 31 behind the injection piston 17 would be high, causing the pressure inside the combustion chamber 12 to be lower.

The opening and closing of the passages 38, 39, 40 increase or decrease the back pressure in the fluid 31 thereby controlling the movement of the injection piston 17.

The current through the coil 43 creates a magnetic field inside the cylinder 44 that draws the plunger 41 into the coil 43. This motion closes the valve. When the current to the coil 43 is terminated, the spring 42 pushes the plunger 41 back to its original position.

The radial passages 38, 39 are of the same size to allow a uniform pressure to be applied to the plunger 41 when the plunger 41 is in the closed position.

By turning the current on and off at specific time intervals and/or changing the current level (amperage), the valve 35 closes and opens, respectively, resulting in an increase or decrease of back pressure. This allows an infinite number of mass flow rates to be realized.

Figure 4:
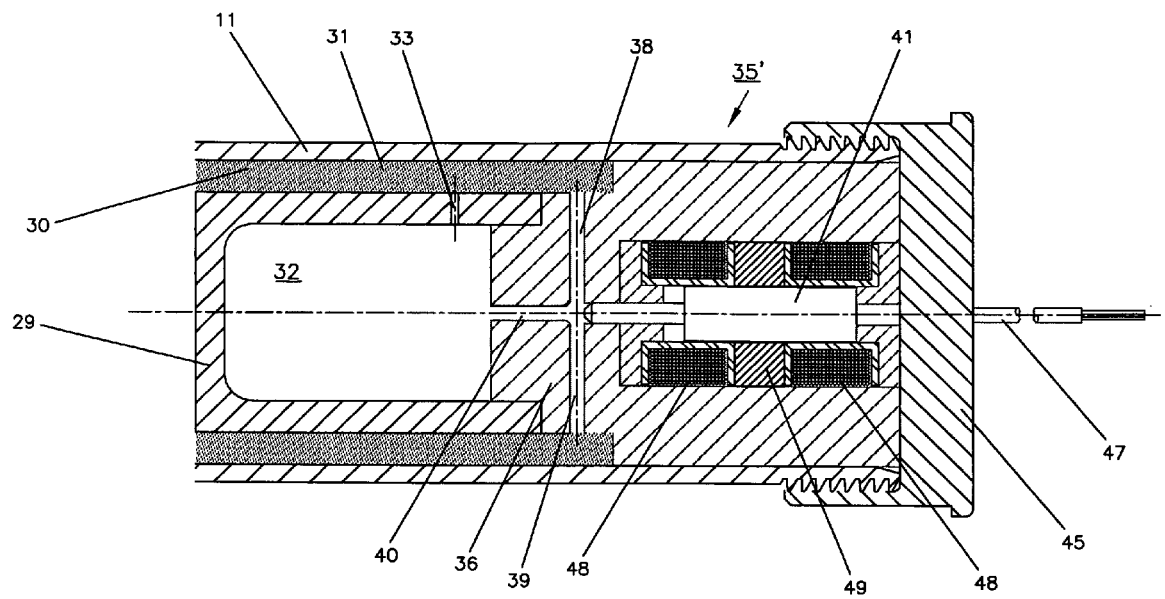
FIG. 4 illustrates a cross-sectional view of an embodiment employing a pair of coils and a permanent magnet for controlling the movement of the plunger shown in the normally opened position.
Figure 5:
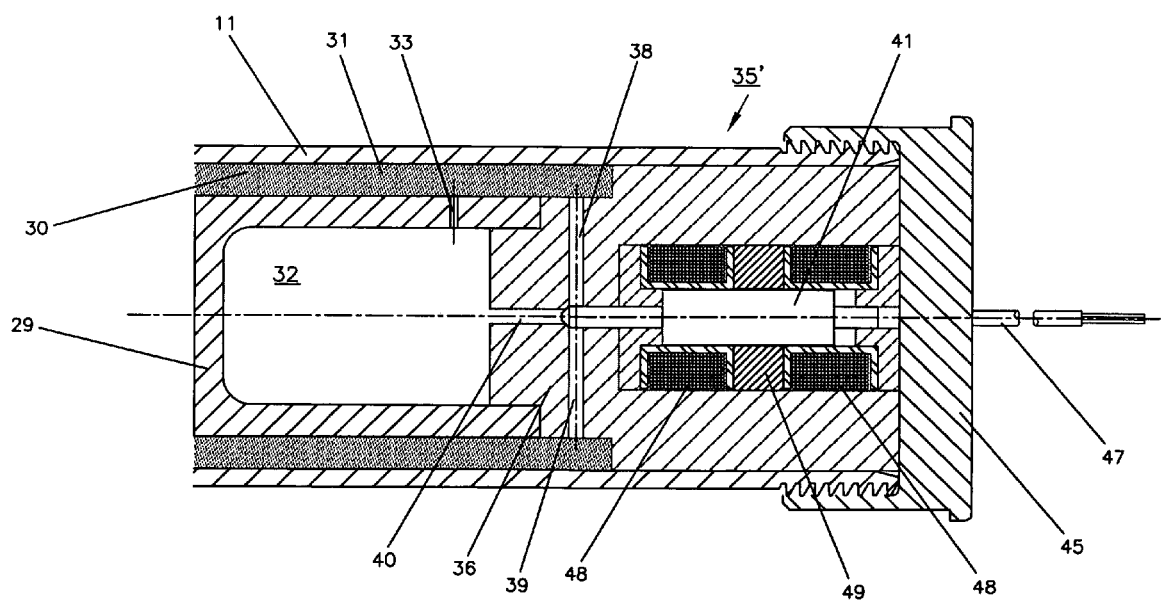
FIG. 5 illustrates a cross-sectional view similar to FIG. 4 of the plunger in a closed position.

Referring to FIGS. 4 and 5 wherein like reference characters indicate like parts as above, the control of the plunger 41 movements may be carried out using a modified electromagnetic valve 35'. As illustrated, the valve 35' includes a pair of spaced apart electrical coils 48 in the valve body 36 about the plunger 41 whereby in response to energization of one of the pair of coils 48, the plunger 41 is caused to move from a normally open position in a direction towards the passage 40 to close the passage 40 (see FIG. 5) to a flow of fluid from the peripheral chamber 29 into the internal chamber 32 thereby slowing movement of the injection piston 17. In response to energization of the other of the pair of coils 48, the plunger 41 is caused to move away from the passage 40 into the normally open position (see FIG. 4).

A permanent magnet 49 of annular shape is also located between the pair of electrical coils 48 and about the plunger 41 for maintaining the plunger 41 in the normally open position with the pair of coils 48 in a deenergized state.

The invention thus provides a variable output inflator that has several advantages over the prior art, including, but not limited to, the smaller compact construction, the inflator can be used for frontal passenger protection as well as size impact protection. There are different types of side airbag modules, such as curtains, thorax, head-thorax and knee bolsters. The smaller diameter also allows the inflator 10 to fit inside a steering column for frontal driver protection. In addition, the fluid 31 used in the inflator 10 is less temperature-sensitive than previously used fluids, thereby ensuring optimal performance over a long period of time.

By way of example, the housing 11 has an outside diameter of 1.8 inches while the cover 45 has an outside diameter of 2.2 inches and the length of the inflator 10 is 8.3 inches. These dimensions would be typical for a passenger side inflator with a propellant load designed to fill a 120 liter airbag. Driver's side and side impact modules with smaller airbags would require less propellant; therefore the inflators would be smaller.

The invention further provides a variable output inflator that can be used to achieve variable combustion time and, therefore, variable bag inflation time.

What is claimed:

1. A variable output inflator comprising
    a housing defining a combustion chamber therein and at least one port for expelling combustion gas from said combustion chamber;
    an initiator mounted on said housing for introducing a combustion gas into said combustion chamber;
    an injection piston assembly mounted in said combustion chamber of said housing, said assembly including an injection piston defining a propellant chamber therein, a sealed container in said propellant chamber having a charge of liquid propellant therein, a cover mounted on said injection piston to sealingly close said propellant chamber with said container therein, and means communicating said propellant chamber with said combustion chamber to deliver liquid propellant thereto, said injection piston being slidably mounted in said housing for movement between an initial position and a second position in response to the introduction of a combustion gas into said combustion chamber from said initiator;
    an accumulator mounted in said housing to define a peripheral chamber therewith for receiving a fluid therein, said accumulator having an internal chamber for receiving the fluid, at least one port communicating said peripheral chamber with said internal chamber; and
    a tape disposed over said port to block communication of said peripheral chamber with said internal chamber, said tape being rupturable in response to an increase in pressure in said peripheral chamber in response to movement of said injection piston from said first position towards said second position.

2. An inflator as set forth in claim 1 wherein said injection piston includes a peripheral skirt coaxial of said peripheral chamber for movement into said peripheral chamber in response to movement from said first position into said second position.

3. An inflator as set forth in claim 1 further comprising an electromagnetic valve mounted in said housing for controlling movement of said injection piston from said first position to said second position, said electromagnetic valve including a valve body disposed in sealed relation with said accumulator, at least one passage extending through said valve body to communicate said peripheral chamber with said internal chamber, a plunger for selectively opening and closing said passage to the flow of fluid and an electrical coil in said valve body about said plunger whereby in response to energization of said coil, said plunger is caused to move from a normally open position in a direction towards said passage to close said passage to a flow of fluid from said peripheral chamber into said internal chamber thereby slowing movement of said injection piston.

4. An inflator as set forth in claim 3 wherein said electromagnetic valve includes a spring for biasing said plunger into said normally open position.

5. An inflator as set forth in claim 3 wherein said electromagnetic valve includes a pair of radially disposed passages communicating with said peripheral chamber and an axial passage communicating said pair of radially disposed passages with said internal chamber and wherein said plunger is disposed to seat against said axial passage in a closed position thereof.

6. An inflator as set forth in claim 1 further comprising an electromagnetic valve mounted in said housing for controlling movement of said injection piston from said first position to said second position, said electromagnetic valve including a valve body disposed in sealed relation with said accumulator, at least one passage extending through said valve body to communicate said peripheral chamber with said internal chamber, a plunger for selectively opening and closing said passage to the flow of fluid, and a pair of spaced apart electrical coils in said valve body about said plunger whereby in response to energization of one of said pair of coils, said plunger is caused to move from a normally open position in a direction towards said passage to close said passage to a flow of fluid from said peripheral chamber into said internal chamber thereby slowing movement of said injection piston and in response to energization of the other of said pair of coils, said plunger is caused to move away from said passage into said normally open position.

7. An inflator as set forth in claim 6 further comprising a permanent magnet of annular shape between said pair of electrical coils and about said plunger for maintaining said plunger in said normally open position with said pair of coils in a deenergized state.

8. A variable output inflator comprising
    a housing defining a combustion chamber therein and at least one port for expelling combustion gas from said combustion chamber;
    an initiator mounted on said housing for introducing a combustion gas into said combustion chamber;
    an injection piston assembly mounted in said combustion chamber of said housing, said assembly including an injection piston having a peripheral skirt defining a propellant chamber therein, a cover mounted in said skirt to sealingly close said propellant chamber, and means communicating said propellant chamber with said combustion chamber to deliver liquid propellant thereto, said injection piston being slidably mounted in said housing for movement between an initial position and a second position in response to the introduction of a combustion gas into said combustion chamber from said initiator; and
    an accumulator mounted in said housing to define a peripheral chamber therewith for receiving a fluid therein, said accumulator having an internal chamber for receiving the fluid, at least one port communicating said peripheral chamber with said internal chamber and a tape disposed over said orifice to block communication of said peripheral chamber with said internal chamber, said tape being rupturable in response to a increase in pressure in said peripheral chamber in response to movement of said injection piston from said first position towards said second position.

9. An inflator as set forth in claim 8 wherein said peripheral skirt is coaxial of said peripheral chamber for movement into said peripheral chamber in response to movement from said first position into Said second position.

10. An inflator as set forth in claim 9 further comprising an electromagnetic valve mounted in said housing for controlling movement of said injection piston from said first position to said second position, said electromagnetic valve including a valve body disposed in sealed relation with said accumulator, at least one passage extending through said valve body to communicate said peripheral chamber with said internal chamber, a plunger for selectively opening and closing said passage to the flow of fluid and an electrical coil in said valve body about said plunger whereby in response to energization of said coil, said plunger is caused to move from a normally open position in a direction towards said passage to close said passage to a flow of fluid from said peripheral chamber into said internal chamber thereby slowing movement of said injection piston.

11. An inflator as set forth in claim 9 further comprising an electromagnetic valve mounted in said housing for controlling movement of said injection piston from said first position to said second position, said electromagnetic valve including a valve body disposed in sealed relation with said accumulator, at least one passage extending through said valve body to communicate said peripheral chamber with said internal chamber, a plunger for selectively opening and closing said passage to the flow of fluid, and a pair of spaced apart electrical coils in said valve body about said plunger whereby in response to energization of one of said pair of coils, said plunger is caused to move from a normally open position in a direction towards said passage to close said passage to a flow of fluid from said peripheral chamber into said internal chamber thereby slowing movement of said injection piston and in response to energization of the other of said pair of coils, said plunger is caused to move away from said passage into said normally open position.

12. An inflator as set forth in claim 11 further comprising a permanent magnet of annular shape between said pair of electrical coils and about said plunger for maintaining said plunger in said normally open position with said pair of coils in a deenergized state.

13. A variable output inflator comprising
a housing defining a combustion chamber therein and at least one port for expelling combustion gas from said combustion chamber;
an initiator mounted on said housing for introducing a combustion gas into said combustion chamber;
an injection piston assembly mounted in said combustion chamber of said housing, said assembly including an injection piston defining a propellant chamber therein, a sealed container in said propellant chamber having a charge of liquid propellant therein, a cover mounted on said injection piston to sealingly close said propellant chamber with said container therein, and means communicating said propellant chamber with said combustion chamber to deliver liquid propellant thereto, said injection piston being slidably mounted in said housing for movement between an initial position and a second position in response to the introduction of a combustion gas into said combustion chamber from said initiator; and
an electromagnetic valve mounted in said housing for controlling movement of said injection piston from said first position to said second position, said electromagnetic valve including a valve body disposed in sealed relation with said accumulator, at least one passage extending through said valve body to communicate said peripheral chamber with said internal chamber, a plunger for selectively opening and closing said passage to the flow of fluid, and a pair of spaced apart electrical coils in said valve body about said plunger whereby in response to energization of one of said pair of coils, said plunger is caused to move from a normally open position in a direction towards said passage to close said passage to a flow of fluid from said peripheral chamber into said internal chamber thereby slowing movement of said injection piston and in response to energization of the other of said pair of coils, said plunger is caused lo move away from said passage into said normally open position.

14. A variable output inflator comprising
a housing defining a combustion chamber therein and at least one port for expelling combustion gas from said combustion chamber;
an initiator mounted on said housing for introducing a combustion gas into said combustion chamber;
an injection piston assembly mounted in said combustion chamber of said housing, said assembly including an injection piston defining a propellant chamber therein, a sealed container in said propellant chamber having a charge of liquid propellant therein, a cover mounted on said injection piston to sealingly close said propellant chamber with said container therein, and means communicating said propellant chamber with said combustion chamber to deliver liquid propellant thereto, said injection piston being slidably mounted in said housing for movement between an initial position and a second position in response to the introduction of a combustion gas into said combustion chamber from said initiator;
an accumulator mounted in said housing to define a peripheral chamber therewith for receiving a fluid therein, said accumulator having an internal chamber for receiving the fluid, at least one port communicating said peripheral chamber with said internal chamber; and
a pressure sensitive rupturable means disposed over said port to block communication of said peripheral chamber with said internal chamber, said means being rupturable in response to an increase in pressure in said peripheral chamber in response to movement of said injection piston from said first position towards said second position.

* * * * *